United States Patent Office 3,455,983
Patented July 15, 1969

3,455,983
HALOGEN SUBSTITUTED HYDROXY-BENZALDE-HYDE HYDRAZONIUM SALTS
Erwin Nikles, Liestal, and Otto Rohr, Neu-Allschwil, Switzerland, assignors to Ciba Limited, Basel, Switzerland, a company of Switzerland
No Drawing. Filed Dec. 7, 1965, Ser. No. 512,198
Claims priority, application Switzerland, Dec. 18, 1964, 16,358/64
Int. Cl. C07c *109/04, 141/14, 109/00*
U.S. Cl. 260—459                                    3 Claims

ABSTRACT OF THE DISCLOSURE

Hydrazonium salts are provided which may be represented by the formula

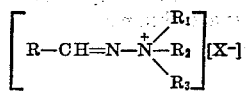

wherein R represents a phenyl radical which contains a hydroxyl group and one, two or three halogen atoms, and $R_1$, $R_2$ and $R_3$ are identical or different lower aliphatic lower aliphatic radicals of which two together may form a ring of 5 to 6 members, if desired through a hetero atom, and X represents an anion. The compounds of the present invention exhibit biocidal properties and are especially useful as herbicides and defoliating agents.

---

The present invention provides new hydrazonium salts of the general formula

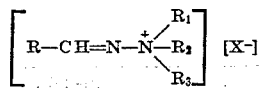

wherein R represents a phenyl radical containing a hydroxyl group and one, two or three halogen atoms, and $R_1$, $R_2$ and $R_3$ are identical or different lower aliphatic radicals of which two together may form a ring of 5 or 6 members, if desired through a hetero atom, and X represents an anion. In this context, lower aliphatic radicals are, for example, lower alkyl, alkenyl, alkinyl, halogenalkyl, halogenalkenyl or halogenalkinyl radicals.

Especially important compounds are those of the formula

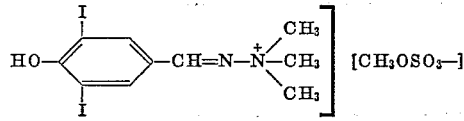

and

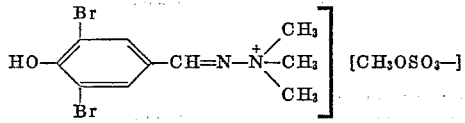

The new hydrazonium salts of the above formula possess valuable biocidal properties, for example, they are potent herbicides and may also be used as defoliating agents.

The new hydrazonium salts of the Formula I are obtained in a simple manner when a hydrazone of the formula

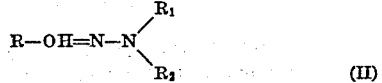

is reacted with a compound of the formula

in which X represents the residue of a strong acid.

The symbol X may, for example, represent a halogen atom, an alkylsulphonyloxy residue or the unilaterally esterified sulphuric acid residue.

The reaction may be carried out in the presence or absence of a solvent. Suitable solvents are, for example, methanol, ethanol, acetone, acetonitrile, benzene or toluene.

The present invention also provides herbicidal preparations as well as preparations for defolating plants, comprising as active ingredient a compound of the formula

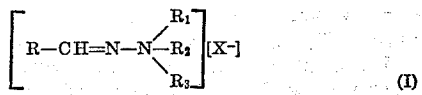

where R represents a phenyl radical containing a hydroxyl group and one, two or three halogen atoms, and $R_1$, $R_2$ and $R_3$ are identical or different lower aliphatic radicals of which two together may form a ring of 5 or 6 members, if desired through a hetero atom, and X represents an anion, together with a suitable carrier. The preparation may also contain one or more of the following additives: a vehicle, a solvent, a dispersant, a wetting agent, an adhesive, a fertilizer and further pesticides.

The products mentioned above are especially suitable for controlling undesired plant growth and for defolating or desiccating plants, for example, tomatoes, cotton or the like.

Since some of the hydrazonium salts of the Formula I are water-soluble, they are extremely simple to apply. In most cases, they may be sprayed in the form of aqueous solutions. Frequently, especially when a long contact period is desired, they may also be applied in the form of solutions or suspensions in organic solvents. Many hydrazonium salts of the Formula I are only sparingly soluble in water; they are formulated by the usual methods. They may be applied in the form of wettable powders, granulates, pellets, emulsifiable oil concentrates or aqueous dispersions.

For the manufacture of dusting and casting preparations there may be used as solid vehicles: talcum, kaolin, bentonite, calcium carbonate, calcium phosphate, or coal, cork meal, wood meal or other materials of vegetable origin. It is also very advantageous to manufacture granulated preparations. The different forms of application may incorporate the usual additives for improving the distribution, the adhesion, the stability towards rain or the penetration. As such substances, there may be mentioned fatty acids, resin, glue, casein and alginates.

The proportion of vehicle used may vary within wide limits, for example from 10 to 98%, referred to the weight of the preparation as a whole. The herbicidal products of this invention advantageously contain a surface-active agent, for example an emulsifier, a wetting agent or a dispersant to facilitate the dispersion of the product in water.

Suitable surface-active agents may be of the cationic, anionic or nonionic kind; mixtures of two or more such agents are likewise suitable.

As wetting agents that can be incorporated in the preparations of this invention, there are preferably used for example, alkyl and alkyl-aryl polyether alcohols, polyoxyethylene sorbitol or sorbitan fatty acid esters, polyethylene glycol fatty acid esters and fatty acid alkylolamides.

The present invention also includes a method of controlling undesired plant growth which comprises applying to a crop area the preparations of the invention as hereinbefore defined.

The products of this invention may be used as such or in admixture or conjunction with conventional herbicides and/or defoliants.

The following examples illustrate the invention.

EXAMPLE 1

(a) 3,5-diiodo-4-hydroxy-benzaldehyde-N,N,N-trimethyl-hydrazonium methosulphate 13.5 parts of N-N-dimethylhydrazine are added to a suspension of 74.8 parts of 3,5-diiodo-4-hydroxy-benzaldehyde in 200 parts by volume of methanol. The aldehyde dissolves immediately and the temperature of the mixture rises slightly. After a short time, the product crystallizes out. The N,N-dimethylhydrazone of 3,5-diiodo-4-hydroxy-benzaldehyde is filtered off and recrystallized from methanol. It melts at 121 to 123° C.

11 parts of dimethyl sulphate are added to a suspension of 20 parts of 3,5-diiodo-4-hydroxy-benzaldehyde-N,N-dimethylhydrazone in 200 parts by volume of anhydrous toluene. The mixture is stirred for a few hours at 80° C. and then allowed to cool. The precipitated product is filtered off, washed with toluene and dried under vacuum; it can be crystallized from alcohol and melts and decomposes at 175 to 180° C.

(b) 3,5-diiodo-4-hydroxy-benzaldehyde-N,N,N-trimethylhydrazonium iodide

A solution of 21 parts of 3,5-diiodo-4-hydroxy-benzaldehyde-N,N1dimethylhydrazone in 250 parts of methyl iodide is boiled for 24 hours. The precipitate formed is filtered off and washed with dry ether; it melts at 202 to 203° C.

(c) 3,5-diiodo-4-hydroxy-benzaldehyde-N-allyl-N,N-dimethyl-hydrazonium bromide

A solution of 21 parts of 3,5-diiodo-4-hydroxy-benzaldehyde-N,N-dimethylhyrazone in 150 parts by volume of allyl bromide is boiled for 3 hours. The crystalline reaction product is filtered off, washed with dry ether and evaporated under vacuum; it melts at 170 to 171° C.

A similar reaction with propargyl bromide gives rise to 3,5-diiodo-4-hydroxy-benzaldehyde-N,N-dimethyl-N-propargyl-hydrazonium bromide which, after crystallization from a mixture of menthanol and ether, melts at 176° C.

EXAMPLE 2

The reaction of halogenhydroxybenzaldehydes and N,N-dimethylhydrazine as described in Example 1 yields the hydrazones listed in the following table. On reaction with dimethyl sulphate or methyl iodide the corresponding quaternary salts are obtained.

| | $R-CH=N-N(CH_3)_2$ | | $R-CH=N-N^{\oplus}(CH_3)_3\ X^{\ominus}$ | |
|---|---|---|---|---|
| | R= | M.P., °C. | X= | M.P., °C. |
| a | 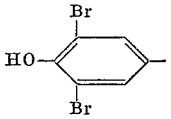 | Gradually crystallizing oil | $CH_3SO_4$ | Unsharply 178–187° (from methanol). |
| b |  | 101–102° (from cyclohexane) | I | 210–211°. |
| c | 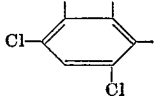 | 119–120° (from toluene+ cyclohexane). | I | 158–160°. |
| d | 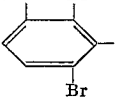 | 111–112° (from cyclohexane) | I | 155–156° (from methanol+ ether). |
| e | 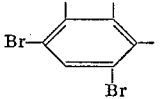 | 124–125° | I | 162–163°. |
| f | 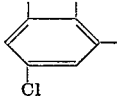 | 96–97° | $CH_3SO_4$ I | 131–132° (from cyclohexane). 179–180°. |
| g | 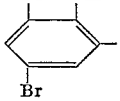 | 94–96° | I | 177–179°. |

EXAMPLE 3

3,5-diiodo-4-hydroxy-benzaldehyde-N-methyl-N,N-pentamethylene-hydrazonium iodide 74.8 parts of 3,5-diiodo-4-hydroxy-benzaldehyde are condensed at room temperature in 500 parts by volume of methanol with 20 parts of N-aminopiperidine. The reaction is accompanied by a slight evolution of heat. After 1 hour, the solution of the product is evaporated and the residue crystallized from cyclohexane; it melts at 118 to 119° C.

20 parts of the hydrazone thus formed are dissolved in 75 parts by volume of methyl iodide and refluxed for 24 hours. The resulting quaternary salt is filtered off, washed with dry ether and dried at 40° C. in a water-jet vacuum; it melts at 192 to 193° C.

EXAMPLE 4

40 parts of dimethylhydrazine are added dropwise to a solution of 96 parts of 3,5-dichloro-4-hydroxy-benzaldehyde in 500 parts by volume of absolute ethanol, during which the temperature of the solution rises to about 40° C. The solvent is then distilled off and the residual oil further processed.

The resulting oil is dissolved in 500 parts by volume of ether and a triple excess of dimethyl sulphate (200 parts) is added. After approximately 1 hour, the precipitated product is filtered off, washed with ether and dried. Yield: 173 parts. Melting point 98 to 105° C.

EXAMPLE 5

The compound obtained in Example 1 was turned into a wettable powder in the following manner:

| Ingredient— | Percent content |
|---|---|
| 3,5 - diiodo - 4 - hydroxy - benzaldehyde-N,N, N-trimethyl-hydrazonium methosulphate | 30 |
| Calcium silicate | 68 |
| Alkyl-aryl sulphonate | 1.75 |
| Methylcellulose | 0.25 |

These four ingredients are intimately mixed in a ball mill, then reduced to a particle size below 50μ in a hammer mill and once more intimately mixed. The powder obtained in this manner is easy to disperse in water.

EXAMPLE 6

The compound obtained in Example 2(a) is turned into an emulsifiable, herbicidal oil concentrate as follows:

| Ingredient— | Percent content |
|---|---|
| 3,5 - dibromo - 4 - hydroxybenzaldehyde - N,N, N-trimethyl-hydrazonium methosulphate | 20 |
| n-Butanol | 15 |
| Alkylnaphthalenes | 10 |
| Polyhydroxyethylene lauryl ether | 10 |
| Diesel oil | 45 |

The resulting concentrate can be diluted with water in any desired proportion, for example to a concentration of 6, 4 or 2% of active ingredient.

EXAMPLE 7

The compounds of Examples 1(a) and 2(a) were formulated as described in Example 5.

The two compounds were tested on different plants by the post-emergence method in a greenhouse. The effects obtained on these test plants are listed in the following table:

| Plant tested | Compound 1a | | Compound 2a | |
|---|---|---|---|---|
| | 2.5 kg. As | 5.0 kg. As | 2.5 kg. As | 5.0 kg. As |
| Triticum vulgare | 1 | 1 | 0 | 0 |
| Hordeum vulgare | 1 | 1 | 0 | 0 |
| Avena sativa | 1 | 2 | 0 | 0 |
| Beta vulgaris | 10 | 10 | 10 | 10 |
| Calendula chrys | 10 | 10 | 10 | 10 |
| Linium usitatissinum | 10 | 10 | 1 | 4 |
| Brassica rapa | 10 | 10 | 7 | 10 |
| Daucus carota | 10 | 10 | 0 | 2 |
| Lactuca sativa | 10 | 10 | 8 | 10 |
| Soja max | 3 | 4 | 0 | 1 |
| Phaseolus vulgaris | 3 | 4 | 4 | 7 |

0=no effect up to 10=100% effect.

Both preparations act well against broad-leaved plants, whereas grain crops tolerate the preparations of this invention well.

What is claimed is:
1. Hydrazonium salts of the general formula

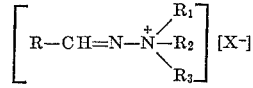

wherein R represents a phenyl radical containing a hydroxyl group and one, two or three chlorine, bromine or iodine atoms, $R_1$, $R_2$ and $R_3$ each represents a member selected from the group consisting of lower alkyl having 1–4 carbon atoms, lower alkenyl having 2–4 carbon atoms and lower alkinyl having 2–4 carbon atoms, and two of said members form an alkylene group which when taken together with the nitrogen atom represent a 5–6 membered ring, and X stands for an anion.

2. The compound of the formula

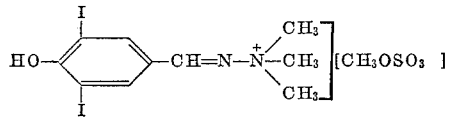

3. The compound of the formula

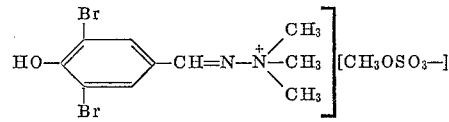

References Cited

UNITED STATES PATENTS 3,197,504   7/1965   Harvey _____ 260—566

OTHER REFERENCES

Smith et al. (I), C.A. volume 52 pp. 1096–1097 (1957).

Smith et al. (II), C.A., volume 58, pp. 12460–12461 (1963).

FLOYD D. HIGEL, Primary Examiner

U.S. Cl. X.R.

71—103, 70, 72, 74, 121; 260—294.8, 566, 600, 293, 296, 312.1, 326.9